US009916685B1

(12) United States Patent
Prabhu et al.

(10) Patent No.: US 9,916,685 B1
(45) Date of Patent: Mar. 13, 2018

(54) SYSTEM AND METHOD FOR DEPTH-RECOVERY OF A FACE IN AN IMAGE

(71) Applicant: Carnegie Mellon University, Pittsburgh, PA (US)

(72) Inventors: Utsav Prabhu, Pittsburgh, PA (US); Marios Savvides, Wexford, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 15/140,842

(22) Filed: Apr. 28, 2016

Related U.S. Application Data

(60) Provisional application No. 62/179,118, filed on Apr. 28, 2015, provisional application No. 62/179,121, filed on Apr. 28, 2015, provisional application No. 62/179,132, filed on Apr. 28, 2015.

(51) Int. Cl.
*G06T 17/10* (2006.01)
*G06T 7/00* (2017.01)

(52) U.S. Cl.
CPC ............ *G06T 17/10* (2013.01); *G06T 7/0051* (2013.01); *G06T 2207/10004* (2013.01); *G06T 2207/30201* (2013.01)

(58) Field of Classification Search
CPC ............... G06K 9/621; G06K 9/00288; G06T 2207/30201; G06T 7/33; G06F 19/26
See application file for complete search history.

(56) References Cited

U.S. PATENT DOCUMENTS

| | | | |
|---|---|---|---|
| 9,311,564 B2 * | 4/2016 | Savvides ................ G06K 9/481 |
| 2006/0280342 A1 * | 12/2006 | Lee ...................... G06K 9/4661 382/118 |
| 2006/0280343 A1 * | 12/2006 | Lee ...................... G06K 9/4661 382/118 |
| 2009/0310828 A1 * | 12/2009 | Kakadiaris ......... G06K 9/00208 382/118 |
| 2012/0183238 A1 * | 7/2012 | Savvides ............ G06K 9/00201 382/285 |

* cited by examiner

*Primary Examiner* — Iman K Kholdebarin
*Assistant Examiner* — Mai Tran

(57) ABSTRACT

A system and method for providing a fast, efficient and accurate method for recovery of depth information from a single image of a face is disclosed. The technique uses a novel thin-plate spline-based dense-correspondence method to align the face, and the representation incorporates a weighted framework, interpreting the depth recovery problem as a weighted data problem.

10 Claims, 5 Drawing Sheets

(A)　　　　　(B)　　　　　(C)

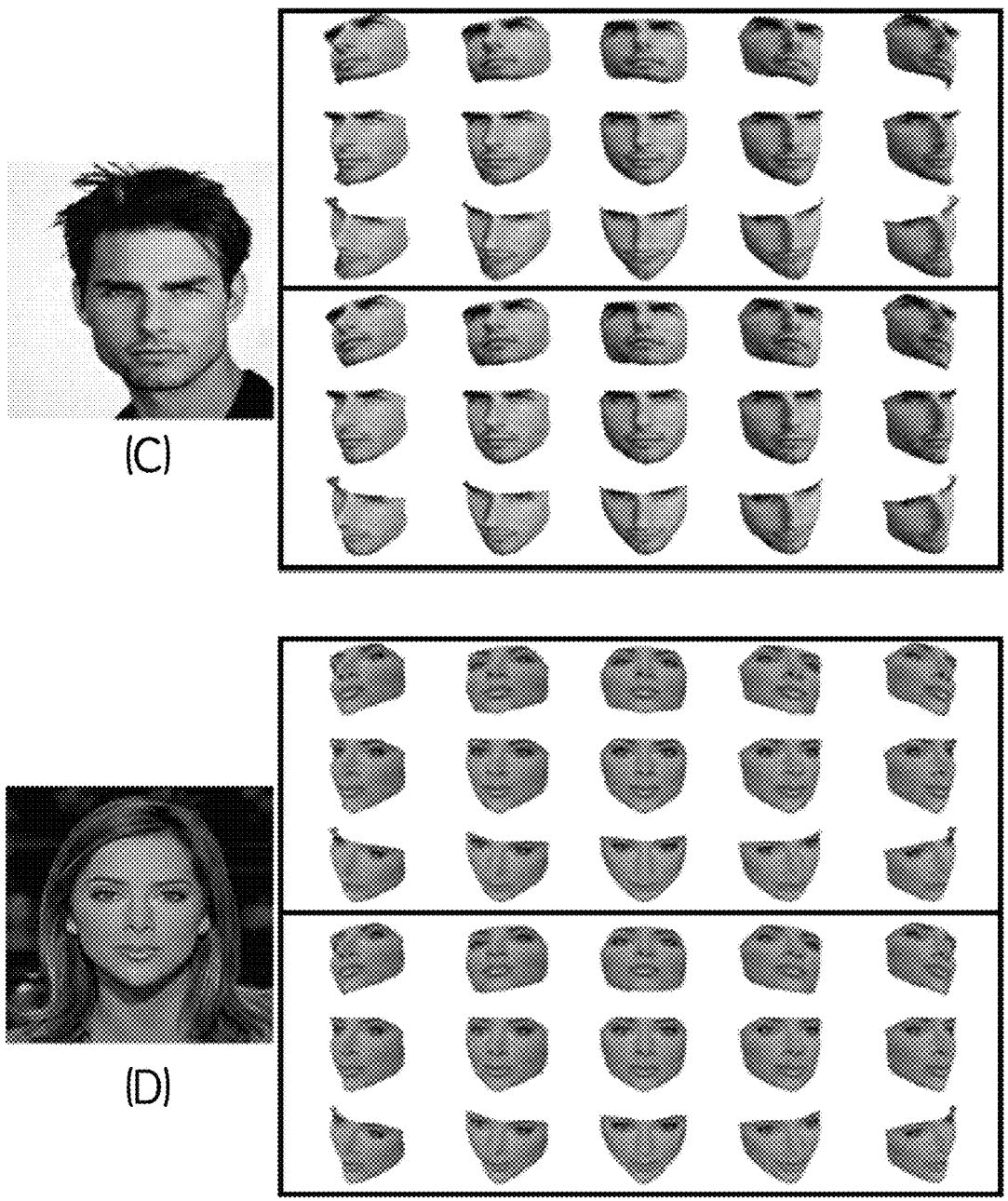
FIG. 2 (con't)

Algorithm 1 The WGHA Algorithm

---
initialize: basis matrix B to a random matrix of size d x k, learning rate n = 0.1
repeat
  Construct index set $\Lambda_n$ by random sampling b indices from {1:n} with replacement
  for $i \in \Lambda_n$ do
    Compute weighted projection of data element $$c_{(.,i)} = (B^T W^2_{(.,i)} B + \lambda_c I)^{-1} B^T W^2_{(.,i)} m_{(.,i)}$$

end for
  Update basis using batch update rule $$B = B + \eta (W_{(.,\Lambda_n)} \odot (M_{(.,\Lambda_n)} - BC_{(.,\Lambda_n)})) C_{(.,\Lambda_n)}$$

Orthonormalize basis by Gram Schmidt procedure $B = BR^{-1}$
  Update learning rate n = n * 0.9
until converged.

Algorithm 2 The WK-SVD Algorthm
---
initialize: the dictionary matrix B to k elements of the data
repeat
  Sparse Coding Stage:
  Use OMP (or other pursuit algorithm) to approximate the solution of $$\hat{C} = \arg\min_{C} \| W \odot (M - BC) \|_F^2 \quad \text{s.t.} \quad \| C_{(i,\cdot)} \|_0 \leq \alpha \; \forall i$$

Dictionary Update Stage:
  for i = 1,...,k do
    Identify the set $\Lambda_i$ of data items which have a non-zero support in the $i^{th}$ dictionary atom.
    Compute the representation error for all data items in the support of this dictionary atom.

$$E_i = M_{(\cdot,\Lambda_i)} - \sum_{i \neq j}^{k} b_j c_{(j,\Lambda_i)}$$

Book-keeping: Identify the set $\Gamma_i$ such that $\sum_{i \in \Lambda_i} W_{(\Gamma_i,1)} \neq 0$
    repeat
      Power Factorization:

$$\hat{c} = (\hat{b}^T W^2_{(\Gamma_i,\Lambda_i)} \hat{b} + \lambda_C I)^{-1} \hat{b}^T W^2_{(\Gamma_i,\Lambda_i)} M_{(\Gamma_i,\Lambda_i)}$$

$$\hat{b} = (\hat{c}^T W^2_{(\Gamma_i,\Lambda_i)} \hat{c} + \lambda_B)^{-1} \hat{c}^T W^2_{(\Gamma_i,\Lambda_i)} M_{(\Gamma_i,\Lambda_i)}$$

$$\hat{b} = \hat{b}/\|\hat{b}\|$$

until converged.
    Update $b_{(\Gamma_i,i)} = \hat{b}$, $\hat{c}_{(\Gamma_i,i)} = \hat{c}$
  end for
until converged.

FIG. 4

SYSTEM AND METHOD FOR DEPTH-RECOVERY OF A FACE IN AN IMAGE

RELATED APPLICATIONS

This application claims the benefit of U.S. Provisional Patent Applications Nos. 62/179,118, filed Apr. 28, 2015, 62/179,121, filed Apr. 28, 2015 and 62/179,132, filed Apr. 28, 2015, all of which is incorporated herein in their entireties.

GOVERNMENT INTEREST

This invention was made with government support under U.S. Department of Justice Award No. 2013-IJ-CX-K005. The U.S. government has certain rights in this invention.

BACKGROUND OF THE INVENTION

Automated recovery of 3D structural information from 2D images has received considerable attention from researchers over the last couple of decades. The first approaches to recovering 3D structure from 2D information include Shape-from-X techniques (Shading, Texture, Focus, etc). However, the complex appearance of skin under varying illumination makes face modeling using these approaches a very difficult task, and the results from these methods have largely been unsatisfactory. Multi-image techniques such as Structure from Motion or Stereo approaches utilize multiple views of the same face, separated either temporally or by pose, to reconstruct a 3D model, thereby limiting their real-world applicability. Photometric stereo based approaches have been demonstrated to obtain significantly accurate 3D face reconstructions, using multiple wavelengths of light for illumination and imaging. However, these techniques require a controlled illumination condition during acquisition.

Recently, shading information has been combined with generic shape information derived from a single reference model by utilizing global similarity of faces. However, this method is heavily dependent on the relevance of the template, requiring some form of manual initialization, and also the boundary conditions and parameters to be adjusted during the reconstruction process.

3D Morphable Models (3DMMs) are currently the most effective choice for reconstruction of 3D face models from a single image. The 3DMM technique is well understood as a powerful and reliable method for synthesis and analysis of 3D models of everyday objects such as faces. The formulation of the approach allows representation and rendering of a wide variety of 3D structures, textures, poses, and illuminations by controlling a few parameters. Perhaps the most impactful part of the technique is a method to automatically fit these parameters to an observed 2D rendering, hence allowing a complete and accurate reconstruction of 3D shape and texture from a single 2D image. The objective of the fitting procedure is formalized as the minimization of appearance dissimilarity computed in the rendered space, and it is solved by using an iterative stochastic gradient descent based method.

The 3DMM approach was revolutionary and unique when proposed. However, it suffers some draw-backs. To accurately fit a face, it requires manual initialization and oversight, and the iterative nature of the fitting technique makes it slow and therefore unusable for many applications requiring real-time performance. Additionally, the accuracy of the 3D reconstruction has never been thoroughly analyzed in literature; the only evaluation of the technique has been via the indirect route of evaluation of facial recognition across pose variations.

3DMMs demonstrated encouraging results from single input images, using separate linear shape and texture subspaces to describe the space of face models. While the technique is simple in formulation and impressive in reconstruction ability, it suffers from the requirement of manual initialization and the tediousness of the fitting procedure.

Recently, Generic Elastic Models (GEMs) were introduced as a new efficient method to generate 3D models from single 2D images. The underlying assumption in the GEM approach is that pure depth information is not significantly discriminative between individuals and it can be synthesized by using a deformable generic depth model, as long as the (x, y) spatial information of facial features is aligned. However, learning a generic 3D face model requires a large number of faces. Moreover, the use of loop subdivision to refine the mesh and densify the model results in an inhomogenous distribution of vertices on the face, as shown in the middle face in FIG. 1.

Mesh refinement (densification) approaches are typically used in computer graphics and CAD tools to accomplish a similar goal. Previous notable attempts at computing dense correspondences between faces include optical-flow based techniques and adaptive meshing techniques. Perhaps the most popular technique for mesh refinement is loop subdivision, which has known uses for modeling faces, including 3D Generic Elastic Models (3D-GEM). Loop subdivision, and related mesh refinement techniques have two important negative aspects: (1) due to their formulation, they move the positions of the original fiducial points in an irrecoverable manner. This is a potential hazard that must be avoided for accurate resynthesis of the face from the representation. (2) These techniques are principally driven by subdividing the initial triangular mesh that is provided. In the case of faces, this initial triangular mesh is obtained from the fiducial points by means of Delaunay (or similar) triangulation technique, which results in numerous smaller triangles around dense fiducial point locations (such as the eyes and lips), and fewer, larger triangles around areas with sparser fiducial points, such as cheeks. The result is that after mesh refinement, the resulting mesh vertices are severely concentrated around certain areas of the face, leading to a non-homogenous representation. An example of this is depicted in FIG. 1.

Therefore, it would be desirable to find a technique for densification that addresses the deficiencies of methods using loop subdivision for densification.

SUMMARY OF THE INVENTION

To address the problems associated with the loop subdivision method of densification, a novel refinement technique using interpolating splines is disclosed. This results in a set of points which is more homogeneous and which does not require the movement of the initial fiducial points.

Herein, the problem of depth-recovery is cast as a linear missing-data problem, given the observed structure and texture of the face. To do so, the face is represented using a dense 2D correspondence map, parameterized by a thin plate spline (TPS) framework. One of two linear data-completion techniques can be used to recover the missing depth information.

BRIEF DESCRIPTION OF THE FIGURES

FIG. 3 shows the WGHA algorithm.

FIG. 4 shows the WK-SVD algorithm.

DEFINITIONS

Figure 1:
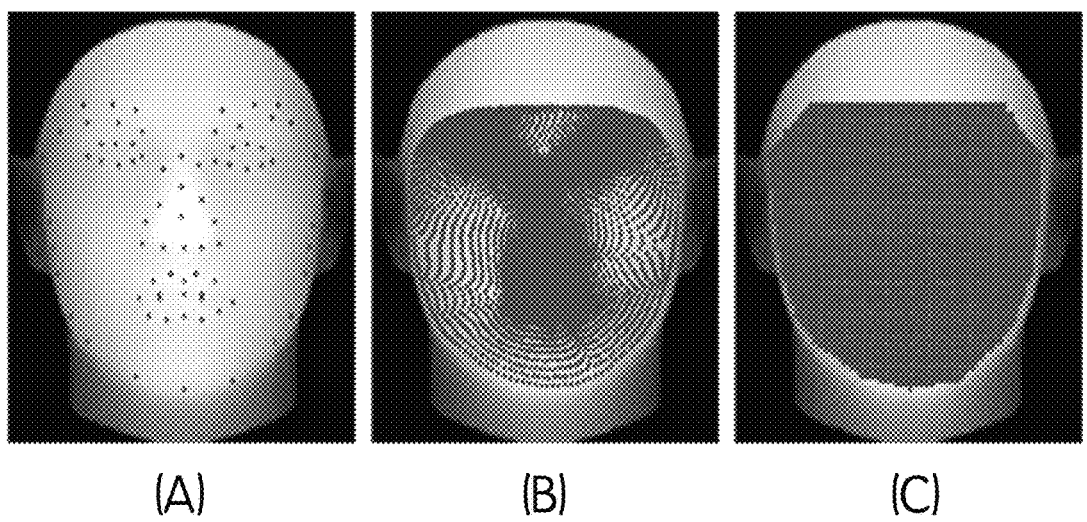
FIG. 1 shows a sample comparison of the vertex distribution of the result of two mesh refinement approaches. (L to R) Original set of 79 fiducial points; dense set of 4,545 points generated by loop subdivision; and comparably dense set of 4,360 points generated by the thin plate spline approach.

The following symbols and notations are used in the equations presented herein to describe the method of the invention.

$m$ A scalar value
m A column vector
M A matrix
$m_{(i,j)}$ The scalar value located at the $i^{th}$ row and $j^{th}$ column of matrix M.
$m_{(-,j)}$ The column vector containing the $j^{th}$ column of M
$M_{(i,-)}$ The column vector containing the transpose of the $i^{th}$ row of M
$M_{(-,j)}$ A diagonal matrix with the $j^{th}$ column of M as diagonal entries
$M_{(i,-)}$ A diagonal matrix with the $i^{th}$ row of M as diagonal entries

DETAILED DESCRIPTION OF THE INVENTION

As a basis for starting the discussion of the system and method, an image of standard resolution is obtained from any manner of image sensing apparatus, including a camera, a video, a scanner, etc. In addition, the method may operate on existing images, obtained, for example, by downloading from the Internet or reading from an electronic file.

To obtain dense semantic correspondences across 2D and 3D faces, a typical detect-align-normalize sequence of pre-processing operations is followed. For the remainder of this document, the assumption is made that any one set of several existing landmark configurations is available, along with the image or 3D model under consideration. For the cases where these fiducial points are not available, the Modified Active Shape Models (MASM) technique could be used to obtain them for images, and Procrustes analysis or Iterative Closest Point (ICP) based approaches could be used to align the 3D data.

To overcome the limitations of subdivision-based techniques, a new refinement technique using interpolating splines is proposed. As with the subdivision approach, this approach begins with the provided fiducial point set of n points. The 2D (x, y) (or 3D (x, y, z)) coordinates of this sparse correspondence set are then used to infer a thin-plate interpolating spline function.

Let the 2D sparse image correspondences of a facial surface, as provided by a fiducial point annotation be represented by the points $(x_i, y_i)$, and let $(\bar{x}_i, \bar{y}_i)$ be the corresponding set of mean 2D coordinates of the fiducial point scheme computed over a database set of such faces. The thin-plate spline solution then allows us to find the smoothest possible real-valued function s which satisfies the interpolation problem $$s(\bar{x}_i, \bar{y}_i) = (x_i, y_i), \forall i = 1, 2, \ldots, 45 \quad (1)$$

i.e. s captures the deviation of the 2D feature points from the mean. The measure of smoothness used in this case is the integral $$I(s_i) = \int\int_{\Re^2} \left(\frac{\partial^2 s}{\partial x^2}\right)^2 + 2\left(\frac{\partial^2 s}{\partial x \partial y}\right)^2 + \left(\frac{\partial^2 s}{\partial y^2}\right)^2 dx dy \quad (2)$$

It is important to note that the above penalty function does not penalize linear transformations. For the purposes of this application, this is of significant advantage, because it is desirable that linear variations such as rotation and scaling do not affect the mesh densification process. The variational problem of minimizing Eq. (2) subject to the interpolation constraints in Eq. (1) has a unique solution given by the thin plate spline of the form $$s(\bar{x}_i, \bar{y}_i) = a_0 + a_1 x + a_2 y + \Sigma_{i=1}^{4.5} \lambda_i r_i^2 \log r_i \quad (3)$$

where $a_0$, $a_1$, $a_2$ represent the rigid deformation coefficients, $\lambda_i$ represents the non-rigid spline deformation coefficients, and $r_i^2 = (x-x_i)^2 + (y-y_i)^2$. It turns out that, the integral smoothness measure (2) is finite if and only if the non-rigid coefficients $\lambda_i$ have the properties:

$$\sum_{i=1}^{n} \lambda_i = 0, \sum_{i=1}^{n} \lambda_i x_i = 0, \sum_{i=1}^{n} \lambda_i y_i = 0.$$

An efficient and closed-form technique to determine these coefficients by matrix inversion is known. A set of uniformly distributed points on the mean face are selected, and the computed warping function is used to find the correspondences on the test face.

The thin plate spline interpolant is used to overcome the negative aspects of the dense correspondence surface. The resulting vertex set can be selected to be uniformly distributed across the facial surface resulting in a more homogenous representation of the face, achieving a similar overall representation density with fewer vertices. The resulting distributions of the vertices are shown in FIG. 1. Moreover, the use of the spline-based transformation learning framework enables the technique to be agnostic to the particular landmarking scheme used, enabling the technique to be used on several different face datasets, each of which is provided with different manual annotations.

To create a representation for the face, the structural details represented in the 3D vertex coordinates (x, y, z) of each corresponding vertex on the face were concatenated with the textural details represented by the grayscale value g interpolated at that vertex. The resulting representation for each face is a measurement vector $m = [x^T y^T z^T g^T]^T$ where x, y, z represent column vectors containing the x, y, z coordinates of n vertices respectively and g is a column vector containing the corresponding texture indices. Also maintained is another vector $w = [w_x^T w_y^T w_z^T w_g^T]$ of equal length as m, which contains the observation confidence (a value between 0 and 1) of each of the corresponding measurements in m.

The image formation model can be depicted using homogenous coordinates as:

$$\begin{bmatrix} x'^T \\ y'^T \end{bmatrix} = PR_{(\theta,\phi,0)} \begin{bmatrix} x^T \\ y^T \\ z^T \end{bmatrix} \quad (4)$$

for all observed 2D facial correspondences (x', y') in the image, which are modeled by true 3D facial correspondences (x, y, z). P in this case represents a camera projection model, and $R_{(\theta,\emptyset,0)}$ represents a 3D rotation by pitch θ and yaw ∅ (and zero roll). The rotation matrix can be decomposed as a product of three independent rotation matrices:

$$R_{(\theta,\phi,\psi)} = R_\theta^p R_\phi^u R_\psi^r = \begin{bmatrix} 1 & 0 & 0 \\ 0 & \cos(\theta) & -\sin(\theta) \\ 0 & \sin(\theta) & \cos(\theta) \end{bmatrix} \begin{bmatrix} \cos(\phi) & 0 & \sin(\phi) \\ 0 & 1 & 0 \\ -\sin(\phi) & 0 & \cos(\phi) \end{bmatrix} \begin{bmatrix} \cos(\psi) & -\sin(\psi) & 0 \\ \sin(\psi) & \cos(\psi) & 0 \\ 0 & 0 & 1 \end{bmatrix} \quad (5)$$

Assume that the degradation is measured accurately, i.e. the values of θ and φ are known. This could be either manually provided, or estimated using a commercial pose estimation engine. Assume also that the roll angle is zero since it can be overcome by simple image rotation, $R_\psi^r$ is reduced to the identity matrix. The "generic depth model" assumption can be made, as in 3DGEM. Note that, at this stage, no depth model assumption for the structure of the face is being made; this is simply being made to determine vertex visibility for observer texture confidence estimation. This provides a value for z=ẑ (obtained as an average from a set of training data), and also allows the computing of the estimates of the derotated (x, y) as:

$$\begin{bmatrix} x'^T \\ y'^T \end{bmatrix} = \begin{bmatrix} 1 & 0 & 0 \\ 0 & 1 & 0 \end{bmatrix} \begin{bmatrix} 1 & 0 & 0 \\ 0 & \cos(\theta) & -\sin(\theta) \\ 0 & \sin(\theta) & \cos(\theta) \end{bmatrix} \begin{bmatrix} \cos(\phi) & 0 & \sin(\phi) \\ 0 & 1 & 0 \\ -\sin(\phi) & 0 & \cos(\phi) \end{bmatrix} \begin{bmatrix} x^T \\ y^T \\ z^T \end{bmatrix} \quad (6)$$

In this case, a simple orthographic camera projection model is assumed. The formulation can be extended to other models as well, provided the intrinsic camera parameters can be estimated for the same. By simplifying this equation, we get:

$$x^T = \frac{x'^T - \hat{z}^T \sin(\phi)}{\cos(\phi)} \quad (7)$$

$$y^T = \frac{y'^T + \hat{z}^T \sin(\theta)\cos(\phi) - x^T \sin(\theta)\sin(\phi)}{\cos(\theta)} \quad (8)$$

The grayscale texture values are obtained by simple interpolation of the image, as earlier.

The measurement vector m obtained by using this method can be very inaccurate. The underlying "generic depth model" assumption may be a poor approximation of z for certain faces, and this error is amplified with increasing 3D pose angles. Consequently, this may lead to dubious estimates of the underlying (x, y, g) components. While these measurements can hardly be improved (given the conditions of acquisition), it is important to quantify the uncertainty in every single item of the measurement vector. This is exactly what the observation confidence vector w quantifies.

The observation confidences $w_z$ of these measurements is always very low, since the z values are obtained directly from an average estimate. These values are set to 0.1 in a preferred embodiment. The confidences $w_x$ and $w_y$ are directly influenced by the pitch and yaw angles. For example, the larger the yaw (pitch) angle, the more erroneous is the estimation of the x(y) component. As the angle reaches 90°, the confidence of measurement should reach 0. A reasonable confidence measure is obtained as a sigmoid relationship between the angle and the confidences:

$$w_x = 1 - (1 + e^{(A_x - |\theta|)/S_x}), w_y = 1 - (e^{(A_y - |\phi|)/S_y}) \quad (9)$$

The values of $A_x$=45, $A_y$=30, $S_x$=10, $S_y$=5 are empirically determined.

To recovery the depth information (i.e., the z coordinate), a linear data completion algorithm is use. Two such algorithms are proposed herein, referred to as WGHA (Weighted Generalized Hebbian Algorithm) and WK-SVD (Weighted K-means Singular Value Decomposition), shown in FIGS. 4 and 5 respectively. These two data completion algorithms are well-known prior-art algorithms which have been updated to handle weighted data. The recovery of 3D structure from a single 2D image is a difficult problem, as the appearance of a face at a provided pose in an image is a function of several compositional, environmental, situational and acquisitional parameters. However, given domain-specific models constructed using a reasonably large training dataset, and accurate alignment on the provided image, this problem can be overcome.

A data subspace was learned using two popular 3D datasets: (1) the USF HumanID 3D Face database consisting of models of 218 subjects, and (2) the Texas 3D Face Recognition Database consisting of 1, 139 subjects. All of the training data used was manually annotated with the locations of 79 predefined fiducial points. This data is used to construct two linear bases: a principal component basis which is used for $l_2$ recovery and a K-SVD basis which is used for $l_1$ recovery.

TABLE 1

A numerical comparison of depth recovery error obtained by the proposed techniques against the 3D-GEM technique on the Bosphorus database.

| Basis | 3D-GEM | WGHA | WK-SVD |
|---|---|---|---|
| Recovery Algorithm | — | $l_2$ | $l_1$ |
| Normalized Depth Error | 8.442 ± 6.53 | 3.869 ± 2.88 | 2.688 ± 2.29 |

A direct application of the representation model proposed herein is to reconstruct complete 3D structure information of the face from a single 2D image. The resulting 3D model can then be rendered at any desired pose angle, enabling a large number of applications, from off-angle face matching, to graphics applications such as face replacement and alignment. The term pose synthesis refers to the automated generation of high quality, novel, synthetic renderings of a given face at various unique viewpoints.

The problem of pose synthesis is approached as one of depth-recovery, i.e. reconstruction of z components from observations of 2D structure x, y and texture g. For a perfectly frontal image, uncorrupted values of all three components are exactly observed. For off-angle images, these can be reconstructed by using the pose estimate and a simplified depth model assumption.

Figure 2:
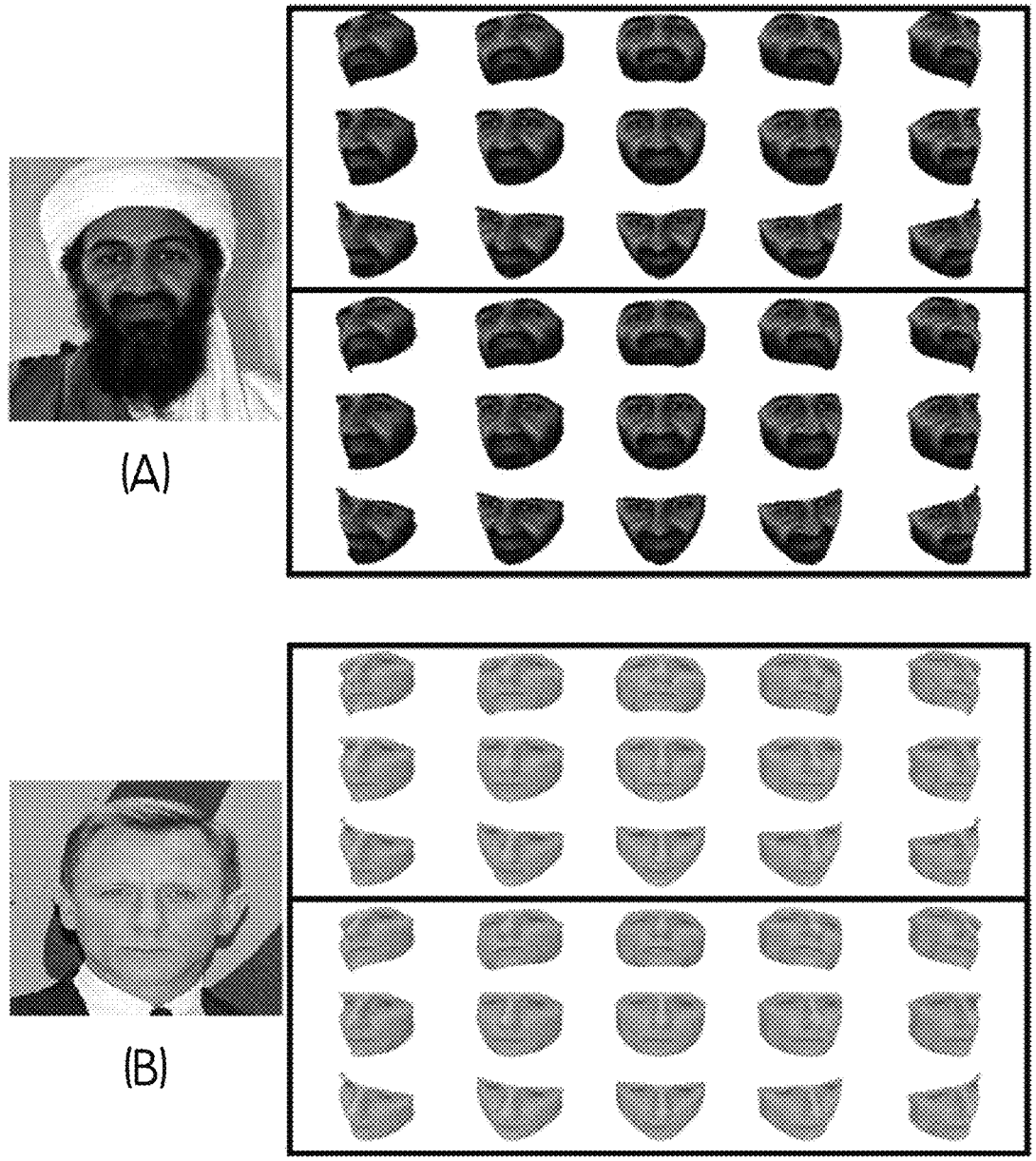
FIG. 2 shows pose synthesis examples on images taken from the Internet. Four sample images are shown, with several synthesized images from both WGHA reconstruction and WK-SVD reconstruction.

Examples of the results of the pose-synthesis technique on images taken from the Internet are shown in FIGS. 2 and 3. In general, it can be seen that both techniques provide plausible, natural-looking renders.

We claim:

1. A system for deriving a 3D model of a face from a 2D image captured with an image sensor, comprising:
 a computing device executing software for performing the functions of:
 (a) placing a plurality of fiducial points at landmarks on said face, each of said fiducial points corresponding to a fiducial point for a mean face calculated over a database set of faces;
 (b) calculating a function which captures the deviation of each fiducial point from said mean fiducial point;
 (c) using a thin-plate spline function to create a test face by minimizing a function which provides a measure of the smoothness of the function calculated in step (b);
 (d) selecting a set of uniformly-distributed points on said mean face; and
 (e) finding a set of points on said test face corresponding to said uniformly-distributed set of points on said mean face; and
 (f) for each point in said set of points on said test face, calculating a depth coordinate.

2. The system of claim 1 wherein said depth coordinates are calculated using a linear data completion algorithm.

3. The system of claim 2 wherein said linear data completion algorithm is selected from a group consisting of WGHA and WK-SVD.

4. The system of claim 1 wherein said software further performs the function of providing a textural value for each point in said set of points on said test face.

5. The system of claim 4 wherein said textural value is a grayscale value.

6. The system of claim 1 wherein said software further performs the function of calculating an observational confidence value for each point in said set of points on said test face.

7. The system of claim 6 wherein said observational confidence values are calculated using a generic depth model.

8. The system of claim 6 wherein said observational confidence values are calculated as a function of a camera projection model and a 3D rotation estimate.

9. The system of claim 8 wherein said 3D rotation estimate is calculated along the pitch and yaw axes.

10. The system of claim 1 wherein said landmarks on said face are at predefined locations and further wherein there are 79 fiducial points.

* * * * *